(12) United States Patent
Sasaki (10) Patent No.: US 7,653,844 B2
(45) Date of Patent: Jan. 26, 2010

(54) COMMUNICATION APPARATUS AND COMMUNICATION SYSTEM

(75) Inventor: Kenichi Sasaki, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 171 days.

(21) Appl. No.: 11/902,915

(22) Filed: Sep. 26, 2007

(65) Prior Publication Data

US 2008/0077828 A1     Mar. 27, 2008

(30) Foreign Application Priority Data

Sep. 27, 2006   (JP) .............................. 2006-262080

(51) Int. Cl.
*G01R 31/28*     (2006.01)

(52) U.S. Cl. ..................... 714/716; 714/715; 714/739; 714/49; 714/821; 714/10; 714/704; 714/709; 714/717; 714/738; 714/744; 370/241; 370/390; 370/465; 370/509; 370/516; 375/226; 375/365; 375/371

(58) Field of Classification Search ........................ None
See application file for complete search history.

(56) References Cited

U.S. PATENT DOCUMENTS

| | | | | |
|---|---|---|---|---|
| 7,054,272 B1 * | 5/2006 | Noel et al. | ................... | 370/241 |
| 7,058,872 B1 * | 6/2006 | Whitby-Strevens | ......... | 714/739 |
| 7,093,172 B2 * | 8/2006 | Fan et al. | ..................... | 714/716 |
| 7,151,379 B2 * | 12/2006 | Christensen | ................. | 324/620 |
| 7,217,743 B2 * | 5/2007 | Kondo | ......................... | 522/81 |
| 7,218,670 B1 * | 5/2007 | Lesea et al. | .................. | 375/226 |
| 2006/0263084 A1 * | 11/2006 | Swenson et al. | .............. | 398/23 |
| 2008/0013609 A1 * | 1/2008 | Daxer et al. | .................. | 375/221 |

OTHER PUBLICATIONS

Lattice Semiconductor Corporation, "10Gb Ethernet XGXS IP Core", Apr. 2004, pp. 4-6 and pp. 11-13.

\* cited by examiner

*Primary Examiner*—John P Trimmings
(74) *Attorney, Agent, or Firm*—IP Law Group, PLLC (57) ABSTRACT

In a communication system based on OSI (Open Systems Interconnection) Reference Model, a pattern body generation circuit of a transmitting device generates and outputs a jitter test pattern body for jitter test. A selector selects an output (frame data) of a transmitting-end upper circuit during normal communication and selects an output (pattern body) of the pattern body generation circuit during jitter test. A transmitting-end MAC circuit performs transmitting-end processing of a MAC layer on the data selected by the selector to thereby obtain a MAC frame. A receiving-end MAC circuit performs receiving-end processing of a MAC layer on a received frame in MAC frame format to thereby obtain a payload. A pattern body verification circuit verifies a pattern body that is a payload obtained by the receiving-end MAC circuit during jitter test against a corresponding pattern body before transmission.

18 Claims, 7 Drawing Sheets

PRIOR ART

COMMUNICATION APPARATUS AND COMMUNICATION SYSTEM

BACKGROUND OF THE INVENTION

1. Field of the Invention

The present invention relates to jitter test and, specifically, to a technique of jitter test in a communication system based on the OSI (Open Systems Interconnection) Reference Model.

2. Description of Related Art

The practical application of the OSI (Open Systems Interconnection) protocol is rapidly expanding as an international standard protocol architecture for multivendor connection, and various connection architectures based on the OSI Reference Model are standardized. Recently, the IEEE (Institute of Electrical and Electronics Engineers) 802.3 Working Group that develops standards for Ethernet (registered trademark), which is MAC (Media Access Control) that is the lower sublayer in Layer 2 (Data link layer) of the OSI Reference Model, defines 10 Gigabit Ethernet (10 GbE) with a data rate of ten times as fast as Gigabit Ethernet as the most recent Ethernet standard by IEEE802.3ae. The introduction of the 10 GbE standard is proceeding in the fields of LAN (Local Area Network)/MAN (Metropolitan Area Network) in addition to backbone networks of communication common carriers.

A scheme of data transmission and receipt in communication equipment at the 10 GbE data rate is described hereinafter.

Figure 5:
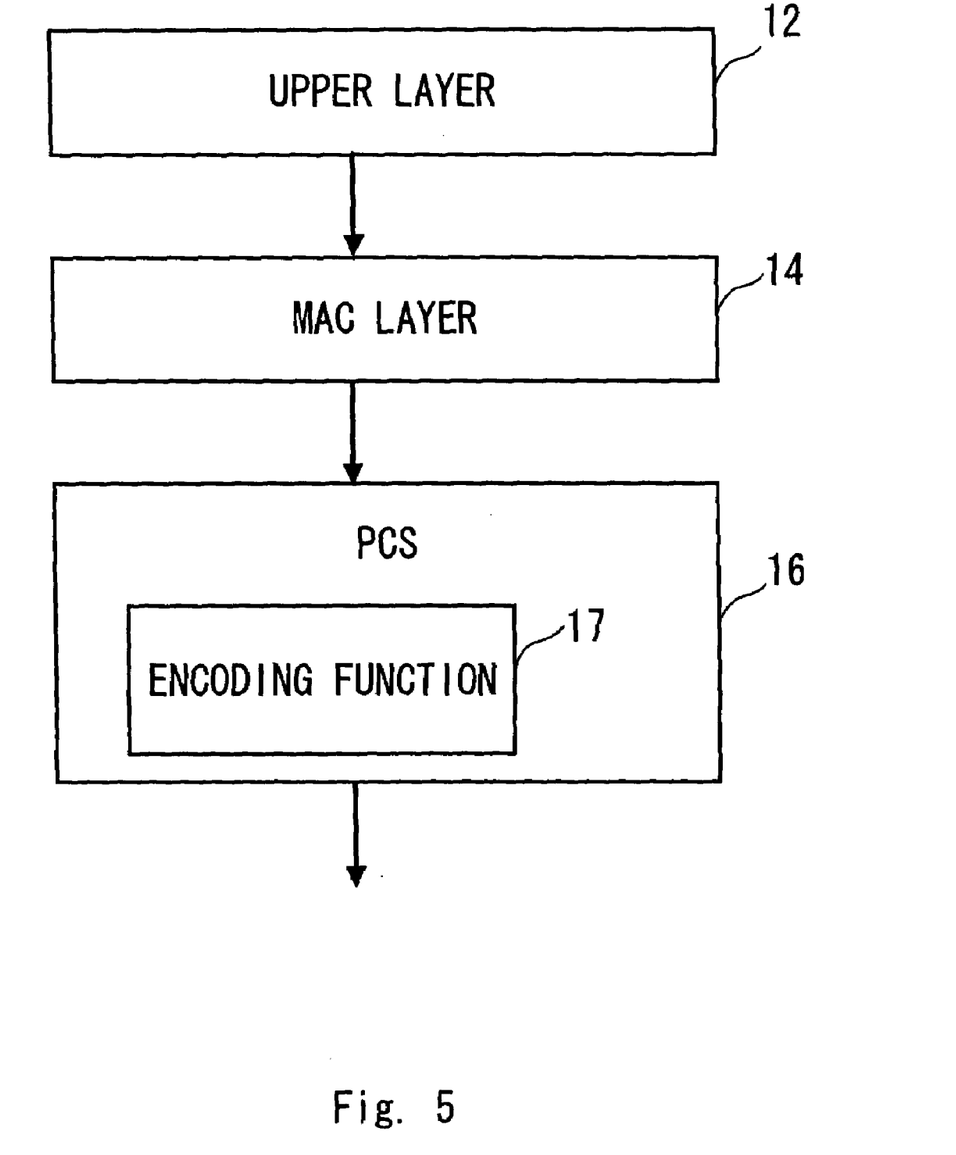
FIG. 5 is a view to describe a processing scheme at a transmitting end in 10 GbE communication equipment.

FIG. 5 is a schematic view of a transmitting end. In a MAC (Media Access Control) layer 14, a MAC frame is generated by adding a synchronizing signal, a CRC (Cyclic Redundancy Check), a minimum packet interval and so on to frame data that is supplied from an upper layer 12.

The MAC frame that is obtained in the MAC layer 14 is output to a PCS (Physical Coding Sublayer) 16. The PCS 16 includes an encoding function 17 and encodes the MAC frame. The MAC frame that is encoded by the PCS 16 is output to a communication line via a physical layer.

Figure 6:
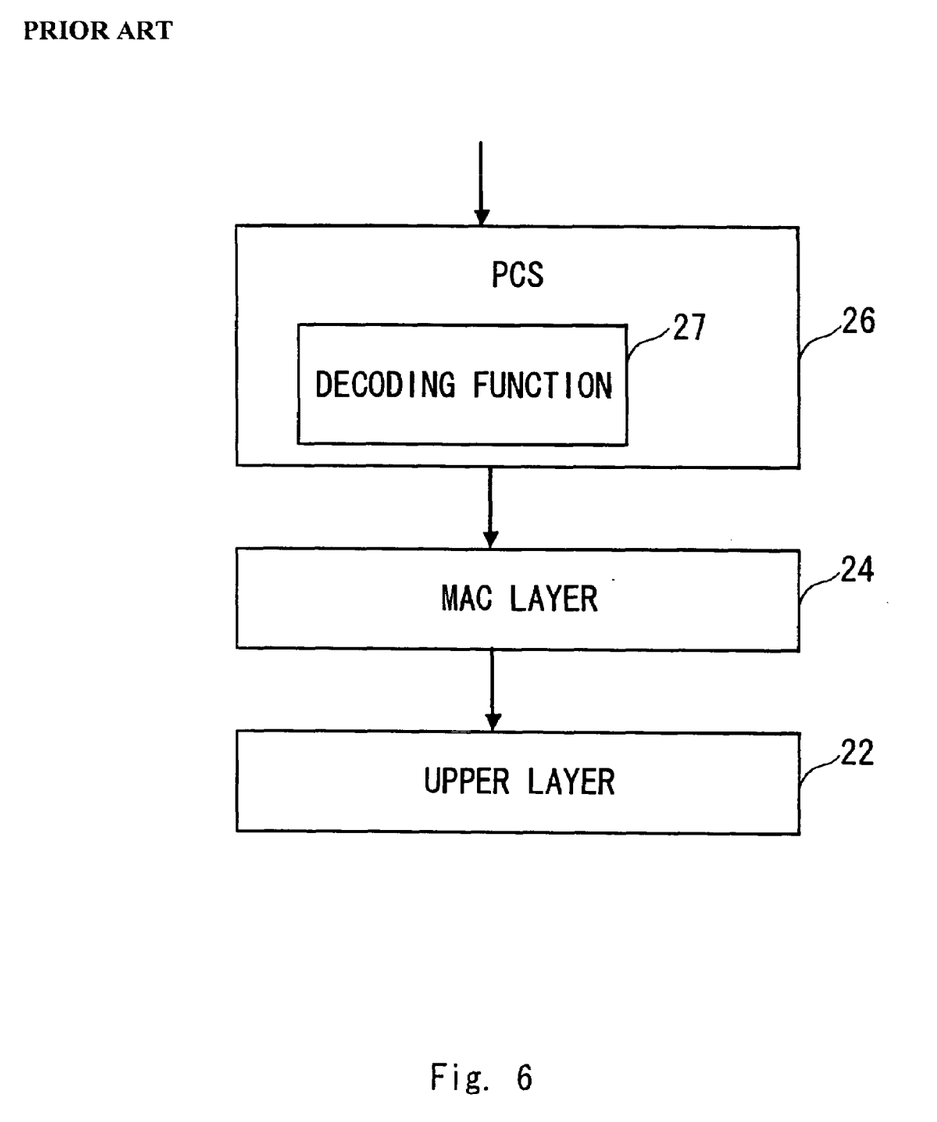
FIG. 6 is a view to describe a processing scheme at a receiving end in 10 GbE communication equipment.

FIG. 6 is a schematic view of a receiving end. In the receiving end, the MAC frame that is transmitted through the communication line is decoded by a decoding function 27 of a PCS 26 and output to a MAC layer 24. In the MAC layer 24, a payload portion that is contained in the MAC frame is extracted from the decoded MAC frame. The extracted payload is supplied to an upper layer 22 and processed therein.

When building a communication system, it is necessary to perform various end-to-end tests. The IEEE802.3ae standard specifies various end-to-end capability evaluation tests, which includes jitter test. In the jitter test, a transmitting end generates a jitter test pattern and outputs it to a communication line, and a receiving end compares the received jitter test pattern which is transmitted through the communication line with the original jitter test pattern, which is the one before being transmitted. Based on the comparison result, the jitter performance of a system is evaluated. The format in the transmission of a jitter test pattern is specified as a MAC frame format by the IEEE802.3ae standard.

A 10 GbE jitter test system is disclosed in Lattice Semiconductor Corporation, "10 Gb Ethernet XGXS IP Core", April 2004, pp. 4-6, pp. 11-13. In this system, a PCS circuit at a transmitting end includes a jitter test pattern generation circuit, and a PCS circuit at a receiving end includes a jitter test pattern verification circuit. During the jitter test, the jitter test pattern generation circuit in the PCS circuit at the transmitting end generates a jitter test pattern and outputs it. The jitter test pattern verification circuit in the PCS circuit at the receiving end compares the received jitter test pattern with the original jitter test pattern. The jitter performance of the system is evaluated based on the comparison result.

The jitter test system that is disclosed in the above document is described hereinafter with reference to FIG. 7.

Figure 7:
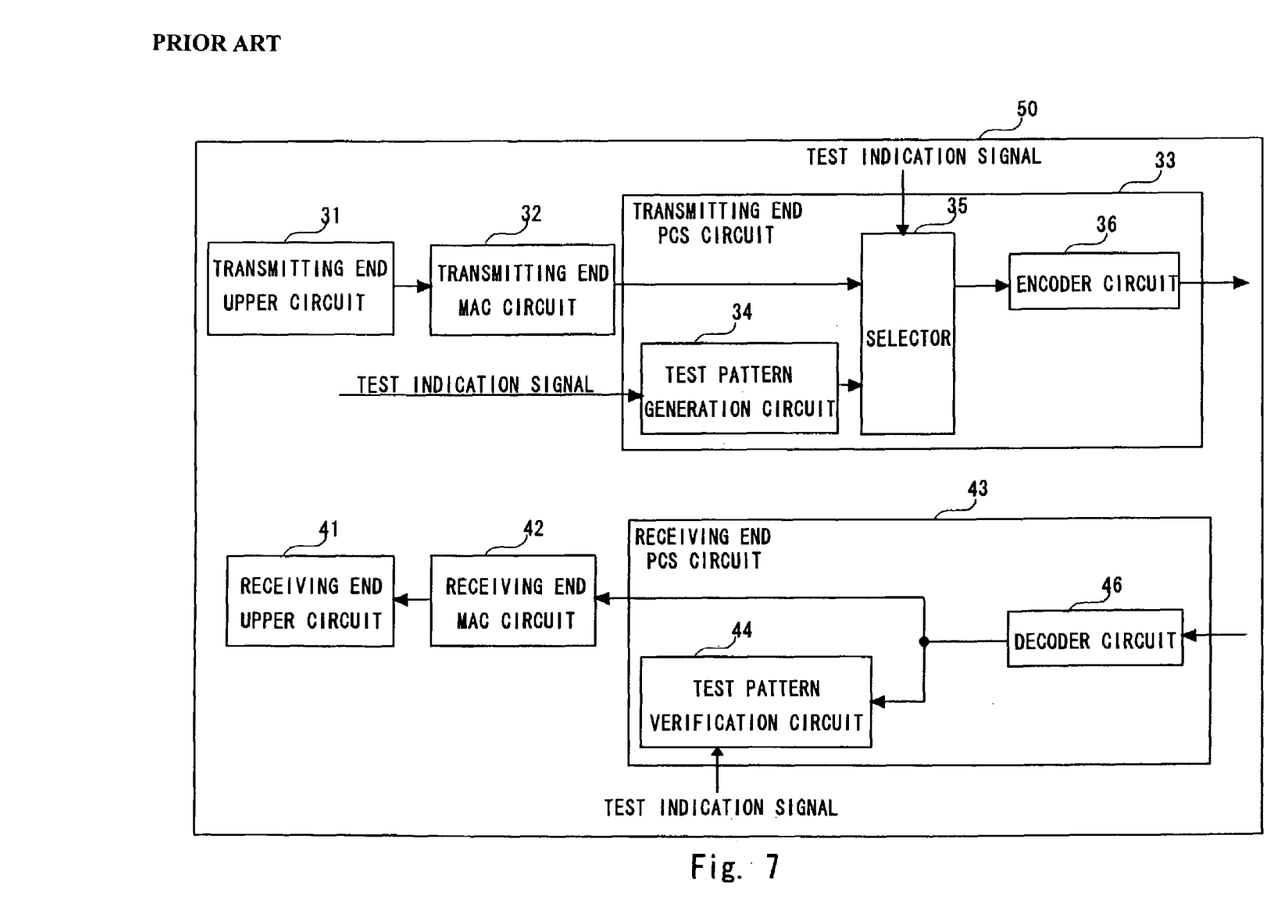
FIG. 7 is a view schematically showing a jitter test system according to a related art.

FIG. 7 is a view schematically showing the jitter test system that is disclosed in the above document. The jitter test system 50 includes a transmitting-end upper circuit 31, a transmitting-end MAC circuit 32, and a transmitting-end PCS circuit 33 as a transmitting end, and also includes a receiving-end PCS circuit 43, a receiving-end MAC circuit 42, and a receiving-end upper circuit 41 as a receiving end. The transmitting-end MAC circuit 32 and the receiving-end MAC circuit 42 perform processing in a MAC layer, and the transmitting-end upper circuit 31 and the receiving-end upper circuit 41 perform processing in an upper layer than MAC.

The transmitting-end MAC circuit 32 generates a MAC frame with the use of data from the transmitting-end upper circuit 31.

The transmitting-end PCS circuit 33 includes a test pattern generation circuit 34, a selector circuit 35, and an encoder circuit 36.

When performing jitter test, a test indication signal that indicates jitter test is transmitted to the test pattern generation circuit 34, the selector circuit 35, and a test pattern verification circuit 44. In response to the test indication signal, the test pattern generation circuit 34 generates a jitter test pattern. Although the selector circuit 35 normally supplies an output of the transmitting-end MAC circuit 32 to the encoder circuit 36, it supplies an output of the test pattern generation circuit 34 to the encoder circuit 36 when it has received the test indication signal.

Because data should be in the MAC frame format when it is output to a communication line, the test pattern generation circuit 34 generates a jitter test pattern in the MAC frame format by adding the portions of a synchronizing signal, a CRC and a minimum packet interval to a main body of a jitter test pattern.

The transmitting-end PCS circuit 33 encodes the MAC frame (frame data or a frame that contains a jitter test pattern body as a payload) that is output from the selector circuit 35 using the encoder circuit 36 and then outputs the encoded MAC frame.

The receiving-end PCS circuit 43 includes a decoder circuit 46 and the test pattern verification circuit 44. The decoder circuit 46 decodes the MAC frame that is transmitted through a communication line and outputs it to the receiving-end MAC circuit 42 and the test pattern verification circuit 44. The receiving-end MAC circuit 42 extracts a payload from the MAC frame that is decoded by the decoder circuit 46 and outputs it to the receiving-end upper circuit 41. The receiving-end upper circuit 41 performs upper processing on the received data.

The test pattern verification circuit 44 performs verification of a jitter test pattern on the MAC frame (which is a MAC frame that contains a main body of a jitter test pattern as a payload in this example) that is output from the decoder circuit 46 when it has received the test indication signal. The verification result of the test pattern verification circuit 44 is used for the evaluation of the jitter performance of the system.

As described above, in the jitter test system 50 shown in FIG. 7, the test pattern generation circuit 34 needs to generate a jitter test pattern in the MAC frame format. Therefore, the test pattern generation circuit 34 needs to generate the synchronizing signal, CRC and minimum packet interval portions, and thus needs to include a circuit for the generation, which causes a circuit size of the test pattern generation circuit 34 to be large. Further, in the receiving end also, the test pattern verification circuit 44 needs to verify the synchronizing signal, CRC and minimum packet interval portions as well, which causes a circuit size of the test pattern verification circuit 44 to be large.

The IEEE802.3ae standard specifies to perform jitter test, and further specifies a jitter test pattern. The jitter test pattern generation circuit and verification circuit that are specified by such a standard should be configured as above.

SUMMARY

One aspect of the present invention is a communication apparatus based on OSI (Open Systems Interconnection) Reference Model. The communication apparatus includes an upper processing unit to perform processing of an upper layer and output frame data, a pattern body generation unit to generate and output a jitter test pattern body for jitter test, a selector to select an output of the upper processing unit during normal communication and select an output of the pattern body generation unit during jitter test, and a transmitting-end MAC unit to perform transmitting-end processing of a MAC (Media Access Control) layer located under the upper layer on data selected by the selector to obtain a MAC frame or a jitter test pattern frame in MAC frame format.

The transmitting-end processing of a MAC layer in the communication apparatus indicates processing of generating and adding a synchronizing signal, a CRC, a minimum packet interval and so on to received data.

Another aspect of the present invention is also a communication apparatus based on OSI Reference Model. The communication apparatus includes a receiving-end MAC unit to perform receiving-end processing of a MAC layer on a received frame in MAC frame format, an upper processing unit to perform processing of an upper layer on frame data obtained from a MAC frame by the receiving-end MAC unit, and a pattern body verification unit to perform verification of a jitter test pattern body obtained from a jitter test pattern frame for jitter test in MAC frame format by the receiving-end MAC unit against a corresponding jitter test pattern body before transmission.

The receiving-end processing of a MAC layer in the communication apparatus indicates processing of extracting a payload portion from a received frame in MAC frame format. In this aspect, the received frame in MAC frame format is either one of a MAC frame containing frame data as a payload or a jitter test pattern frame in MAC frame format during jitter test.

A still another aspect of the present invention is a communication system based on OSI Reference Model. The communication system includes a transmitting device, a receiving device, and a jitter test control device to provide a test instruction to the transmitting device and the receiving device upon execution of jitter test.

The transmitting device includes a transmitting-end upper processing unit to perform processing of an upper layer and output frame data, a pattern body generation unit to generate and output a jitter test pattern body upon receipt of the test instruction, a selector to select an output of the pattern body generation unit upon receipt of the test instruction and select an output of the transmitting-end upper processing unit during normal communication, and a transmitting-end MAC unit to perform transmitting-end processing of a MAC layer located under the upper layer on data selected by the selector to obtain a MAC frame or a jitter test pattern frame in MAC frame format.

The receiving device includes a receiving-end MAC unit to perform receiving-end processing of a MAC layer on a received frame in MAC frame format, a receiving-end upper processing unit to perform processing of an upper layer on frame data obtained from a MAC frame by the receiving-end MAC unit, and a pattern body verification unit to perform verification of a jitter test pattern body obtained from a jitter test pattern frame by the receiving-end MAC unit against a corresponding jitter test pattern body before transmission upon receipt of the test instruction.

A combination of the above elements or an embodiment of the above apparatus or system as an method are also effective as other aspects of the present invention.

The technique of the present invention enables suppression of the circuit size of an apparatus that performs jitter test of a communication system.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Exemplary embodiments of the present invention are described hereinafter with reference to the drawings. In the following description, a "transmitting device" is not limited to a "device that performs transmission only", and it includes a section for transmission within a communication apparatus that perform transmission and reception. Likewise, a "receiving device" is not limited to a "device that performs reception only", and it includes a section for reception within a communication apparatus that perform transmission and reception. A single communication apparatus may include both the "transmitting device" and the "receiving device" that are referred to in the following description.

Figure 1:
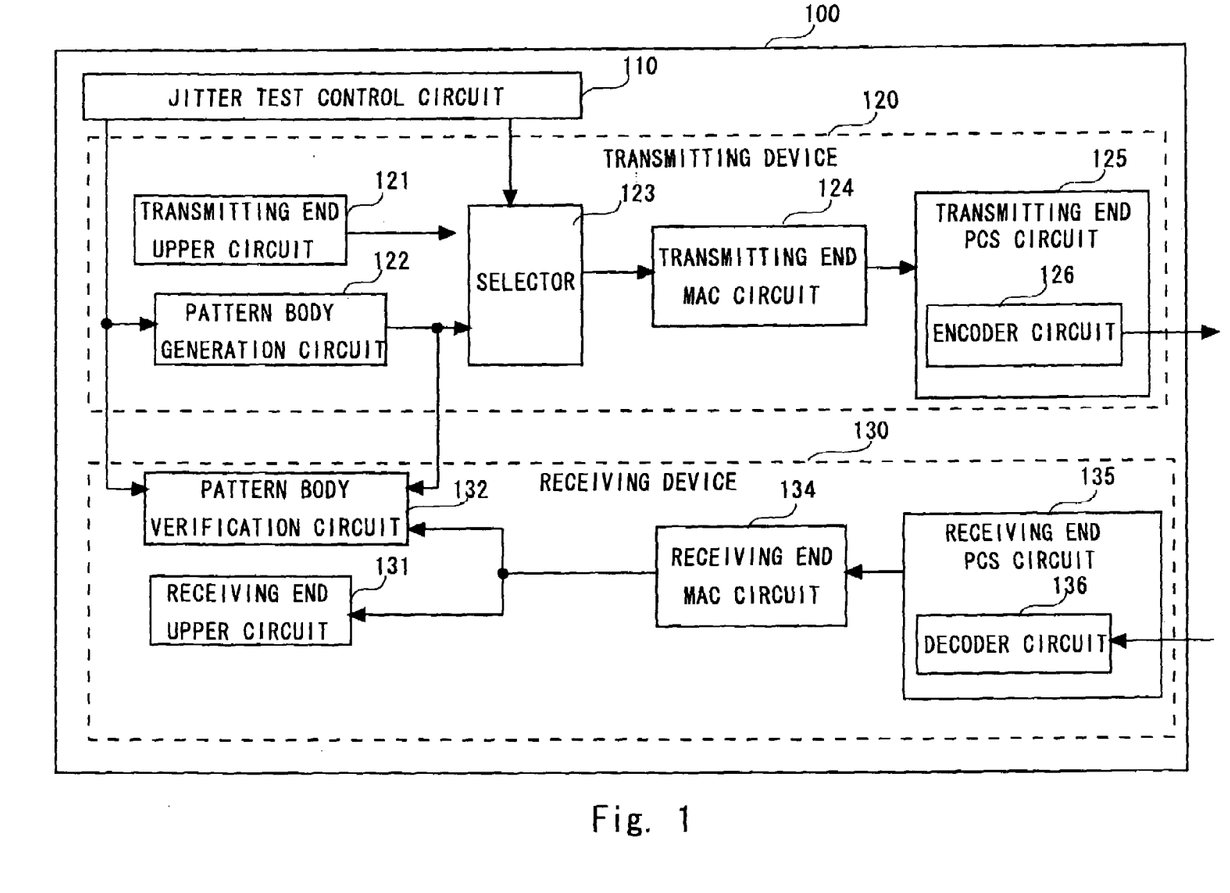
FIG. 1 is a view showing a communication system according to a first embodiment of the present invention.

FIG. 1 shows a communication system 100 according to an embodiment of the present invention. The communication system 100 is based on the OSI Reference Model, and it includes a transmitting device 120, a receiving device 130, and a jitter test control circuit 110 to control the transmitting device 120 and the receiving device 130 to perform jitter test. The communication system 100 transmits a jitter test pattern in the MAC frame format when performing jitter test.

The transmitting device 120 includes a transmitting-end upper circuit 121, a pattern body generation circuit 122, a selector 123, a transmitting-end MAC circuit 124, and a transmitting-end PCS circuit 125. The transmitting-end PCS circuit 125 includes an encoder circuit 126.

The receiving device 130 includes a receiving-end PCS circuit 135, a receiving-end MAC circuit 134, a pattern body verification circuit 132, and a receiving-end upper circuit 131. The receiving-end PCS circuit 135 includes a decoder circuit 136.

The jitter test control circuit 110 outputs a test indication signal that indicates a start of jitter test to the pattern body generation circuit 122, the selector 123, and the pattern body verification circuit 132, thereby starting jitter test.

Firstly, the transmitting device 120 is described in detail below.

The transmitting-end upper circuit 121 performs processing in an upper layer than a MAC layer. The transmitting-end upper circuit 121 outputs frame data, which corresponds to a payload portion of a MAC frame that is generated later by the transmitting-end MAC circuit 124, to the selector 123.

The pattern body generation circuit 122 generates a main body of a jitter test pattern frame (hereinafter, a "jitter test pattern frame" and a "jitter test pattern main body" are referred to simply as a "test pattern frame" and a "pattern body", respectively) that is transmitted from the transmitting device 120. Upon receiving a test indication signal from the jitter test control circuit 110, the pattern body generation circuit 122 starts the generation of a pattern body and outputs it to the selector 123. The pattern body generation circuit 122 also outputs the generated pattern body to the pattern body verification circuit 132 of the receiving device 130.

The selector 123 selects either one output of the transmitting-end upper circuit 121 and the pattern body generation circuit 122 and supplies the selected one to the transmitting-end MAC circuit 124. Specifically, the selector 123 normally supplies an output of the transmitting-end upper circuit 121 to the transmitting-end MAC circuit 124, and, upon receipt of a test indication signal from the jitter test control circuit 110, it supplies an output of the pattern body generation circuit 122 to the transmitting-end MAC circuit 124.

The transmitting-end MAC circuit 124 performs MAC or Media Access Control. Specifically, the transmitting-end MAC circuit 124 generates a MAC frame with the use of the data from the selector 123.

A frame data that is output from the transmitting-end upper circuit 121, a pattern body that is output from the pattern body generation circuit 122, a MAC frame and a test pattern frame that are obtained by the transmitting-end MAC circuit 124 are described hereinbelow.

Figure 2:
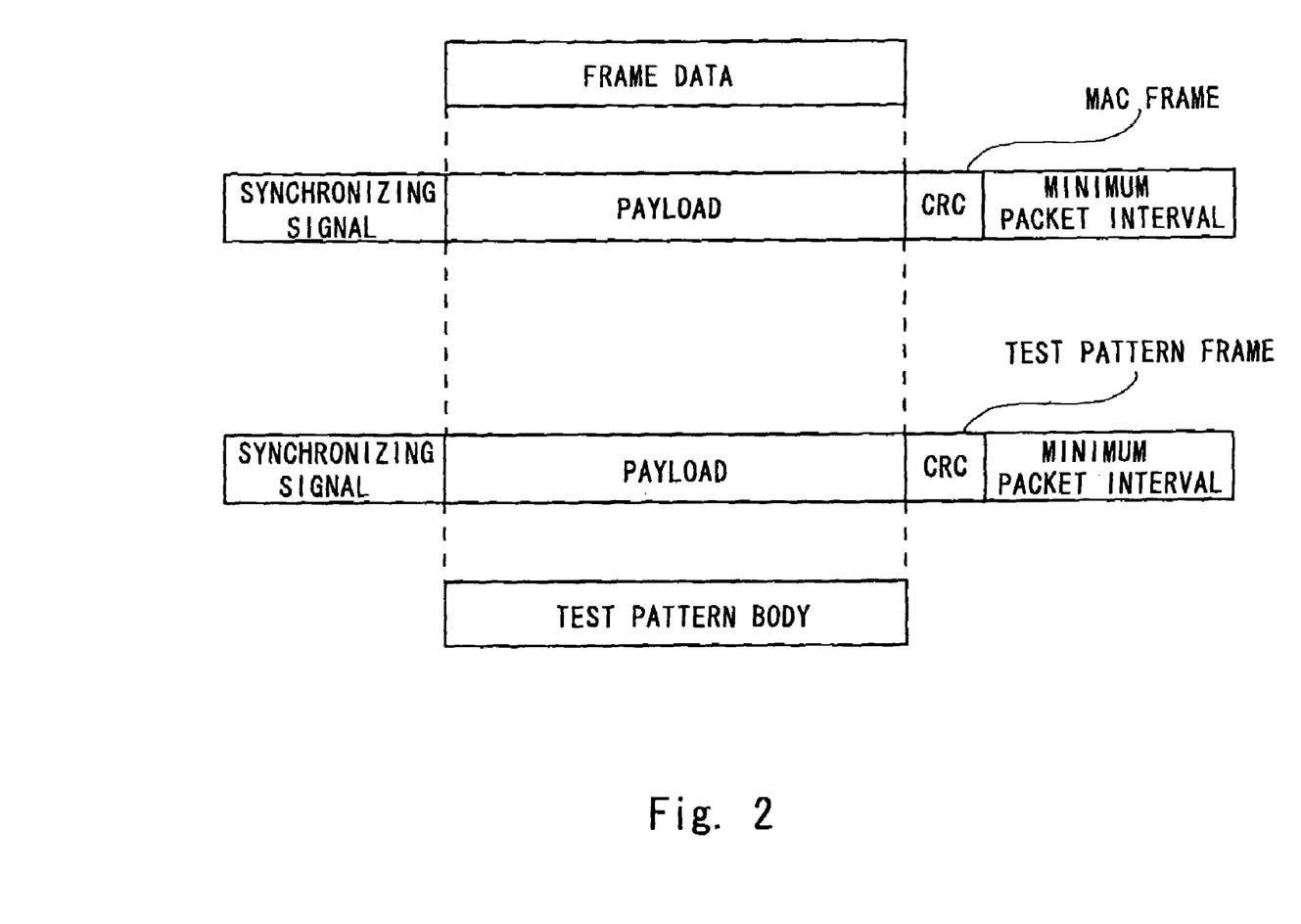
FIG. 2 is a view to describe the format of a MAC frame and a test pattern frame.

The uppermost part of FIG. 2 shows frame data that is output from the transmitting-end upper circuit 121, and the part immediately below the uppermost part shows a MAC frame that is generated from the frame data. As shown therein, the MAC frame is composed of a synchronizing signal, a payload, a CRC and a minimum packet interval. The payload corresponds to the frame data that is output from the transmitting-end upper circuit 121. Thus, the transmitting-end MAC circuit 124 generates each portion of a synchronizing signal, a CRC and a minimum packet interval for frame data and then adds them to the frame data, thereby obtaining the MAC frame.

The lowermost part of FIG. 2 shows a pattern body that is output from the pattern body generation circuit 122, and the part immediately above the lowermost part shows a test pattern frame that is obtained by the transmitting-end MAC circuit 124. As shown therein, the test pattern frame has the same format as the MAC frame, and it is composed of a synchronizing signal, a payload, a CRC and a minimum packet interval. Thus, in the communication system 100 of this embodiment, the pattern body generation circuit 122 generates only a payload portion of a test pattern frame in the MAC frame format that is output finally, and then the transmitting-end MAC circuit 124 performs transmitting-end processing (i.e. the generation and addition of a synchronizing signal, a CRC and a minimum packet interval), which is the same processing as that performed on frame data, on the pattern body, thereby generating a test pattern frame in the MAC frame format from the pattern body.

The transmitting-end MAC circuit 124 outputs the generated MAC frame, including the test pattern frame in the MAC frame format, to the transmitting-end PCS circuit 125. The transmitting-end PCS circuit 125 encodes the MAC frame by the encoder circuit 126. The MAC frame that is encoded in the transmitting-end PCS circuit 125 is output to a communication line via a physical layer circuit, which is not shown.

Next, the receiving device 130 is described in detail below.

The receiving-end PCS circuit 135 decodes the MAC frame that is transmitted through the communication line via the physical layer circuit, which is not shown, by the decoder circuit 136. The receiving-end PCS circuit 135 outputs the decoded MAC frame to the receiving-end MAC circuit 134.

The receiving-end MAC circuit 134 performs processing that is reverse to the processing in the transmitting-end MAC circuit 124. Specifically, the receiving-end MAC circuit 134 extracts a payload portion from the decoded MAC frame.

The receiving-end MAC circuit 134 outputs the extracted payload to the pattern body verification circuit 132 and the receiving-end upper circuit 131 that performs processing in an upper layer than a MAC layer.

The pattern body verification circuit 132 operates when it receives a test signal from the jitter test control circuit 110, and it verifies the payload that is output from the receiving-end MAC circuit 134 against the pattern body (original pattern body) that is output from the pattern body generation circuit 122. The payload that is output from the receiving-end MAC circuit 134 is the original pattern body after being transmitted through the communication line, and the pattern body verification circuit 132 compares if the transmitted pattern body matches with the original pattern body.

Based on the comparison result, the jitter performance of the communication system 100 is evaluated.

As described above, in the communication system 100 of this embodiment, the transmitting device 120 assembles a pattern body that is generated by the pattern body generation circuit 122 into a MAC frame with the use of a unit (i.e. the transmitting-end MAC circuit 124) to perform transmitting-end processing of a MAC layer on frame data from an upper layer, which is placed in a communication apparatus based on the OSI Reference Model. In this configuration, the pattern body generation circuit 122 only needs to generate a pattern body, and does not need to generate synchronizing signal, CRC and minimum packet interval portions or the like and add them to a pattern body, thus enabling the reduction of circuit size.

Likewise, the receiving device 130 extracts a pattern body from a test pattern frame in the same format as a MAC frame with the use of a unit (i.e. the receiving-end MAC circuit 134) to extract a payload from a received MAC frame, which is placed in a communication apparatus based on the OSI Reference Model, and outputs it to the pattern body verification circuit 132. In this configuration, the pattern body verification circuit 132 only needs to compare a received pattern body with an original pattern body, and does not need to verify the synchronizing signal, CRC and minimum packet interval portions, which are not necessary to verify, thus enabling the reduction of circuit size.

It is thereby possible to eliminate an unnecessary circuit for a jitter test pattern that is specified by the standard.

Although the jitter test control circuit 110 is separated from the transmitting device 120 and the receiving device 130 in the communication system 100 of the above-described embodiment, the jitter test control circuit may be placed in either one of the transmitting device 120 and the receiving device 130 or in both of the transmitting device 120 and the receiving device 130 as long as it can provide a test instruction to the transmitting device 120 and the receiving device 130. When the jitter test control circuit is placed in either one of the transmitting device 120 and the receiving device 130, the jitter test control circuit may be connected with the other device so as to provide a test instruction to the other device. On the other hand, when the jitter test control circuit is placed in both of the transmitting device 120 and the receiving device 130, two jitter test control circuits may provide a test instruction to each device in synchronization with each other.

Further, although the pattern body generation circuit 122 outputs an original pattern body directly to the pattern body verification circuit 132 in the communication system 100 of the above-described embodiment, the configuration to supply an original pattern body to the pattern body verification circuit 132 is not limited thereto. For example, the pattern body verification circuit 132 may store an original pattern body in advance, or the receiving device 130 may include a receiving-end pattern body generation circuit that generates the same pattern body in synchronization with the pattern body generation circuit 122 and supplies it to the pattern body verification circuit 132.

Furthermore, the jitter test control circuit does not necessarily have a configuration to output a test indication signal to a transmitting device or a receiving device, and it may have any configuration as long as it can implement substantially the same function as the jitter test control circuit 110.

A system that has a function to evaluate the jitter performance of a communication system based on a verification result of a pattern body in a receiving device is also included within the scope of the present invention.

It is required in some communication architectures to be compatible with a plurality of kinds of jitter test patterns. For example, the 10 GbE standard specifies two kinds of jitter test patterns. If the technique of the present invention is applied to such a communication system, the effect of reducing circuit size is more significant.

A modified version of the communication system 100 is described hereinafter as a second embodiment.

Figure 3:
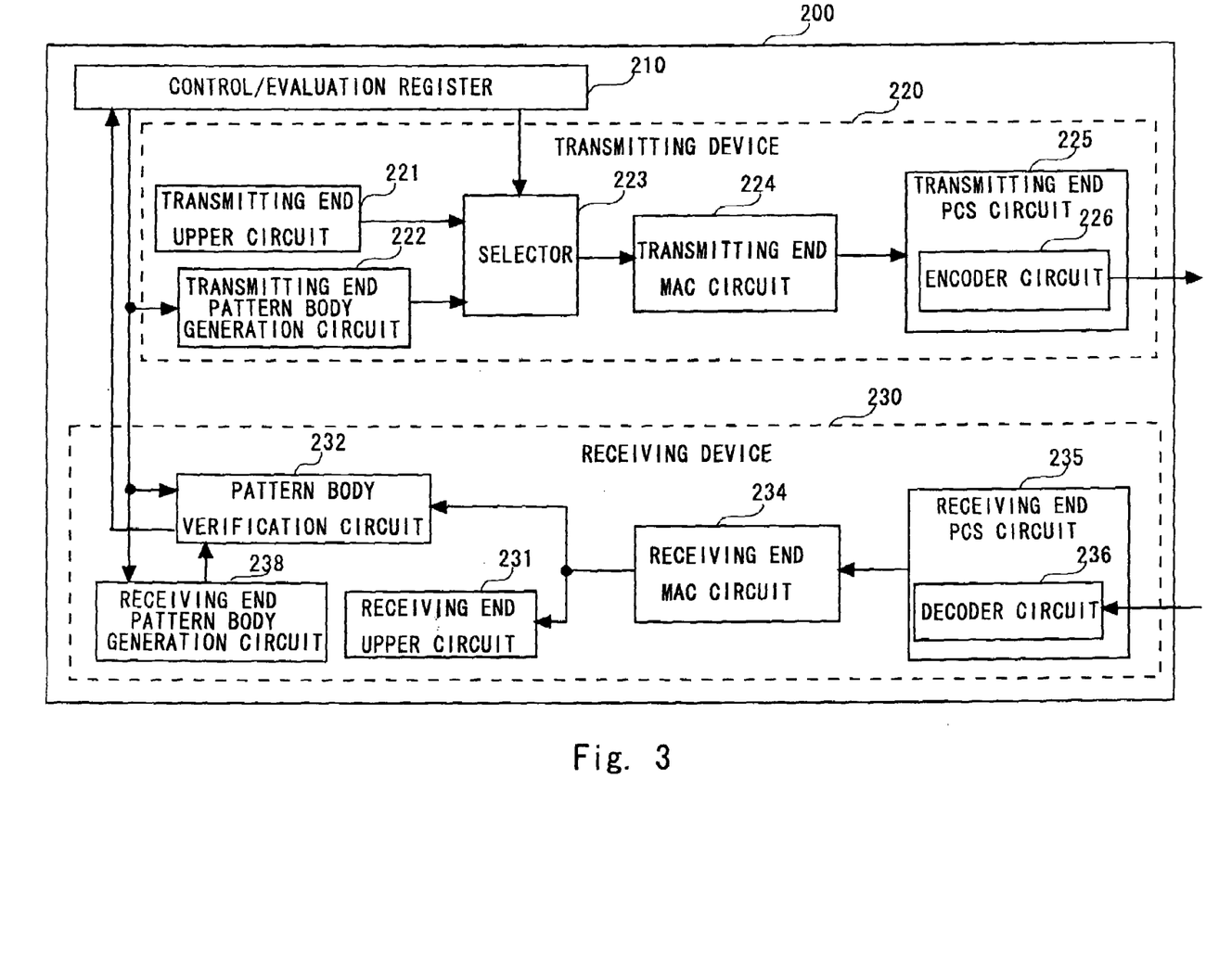
FIG. 3 is a view showing a communication system according to a second embodiment of the present invention.

FIG. 3 shows a communication system 200 according to the second embodiment of the present invention. The communication system 200 is also a 10 GbE communication system that is specified by the IEEE802.3ae standard, and it includes a transmitting device 220, a receiving device 230, and a control/evaluation register 210 to perform the control of jitter test and the evaluation of jitter performance.

The transmitting device 220 includes a transmitting-end upper circuit 221, a transmitting-end pattern body generation circuit 222, a selector 223, a transmitting-end MAC circuit 224, and a transmitting-end PCS circuit 225. The transmitting-end PCS circuit 225 includes an encoder circuit 226.

The receiving device 230 includes a receiving-end PCS circuit 235, a receiving-end MAC circuit 234, a pattern body verification circuit 232, a receiving-end upper circuit 231, and a receiving-end pattern body generation circuit 238. The receiving-end PCS circuit 235 includes a decoder circuit 236.

The transmitting-end upper circuit 221, the transmitting-end MAC circuit 224, the transmitting-end PCS circuit 225, the receiving-end PCS circuit 235, the receiving-end MAC circuit 234, and the receiving-end upper circuit 231 operate in the same manner as the equivalent functional blocks in the communication system 100 shown in FIG. 1, and they are not described in detail herein.

Figure 4:
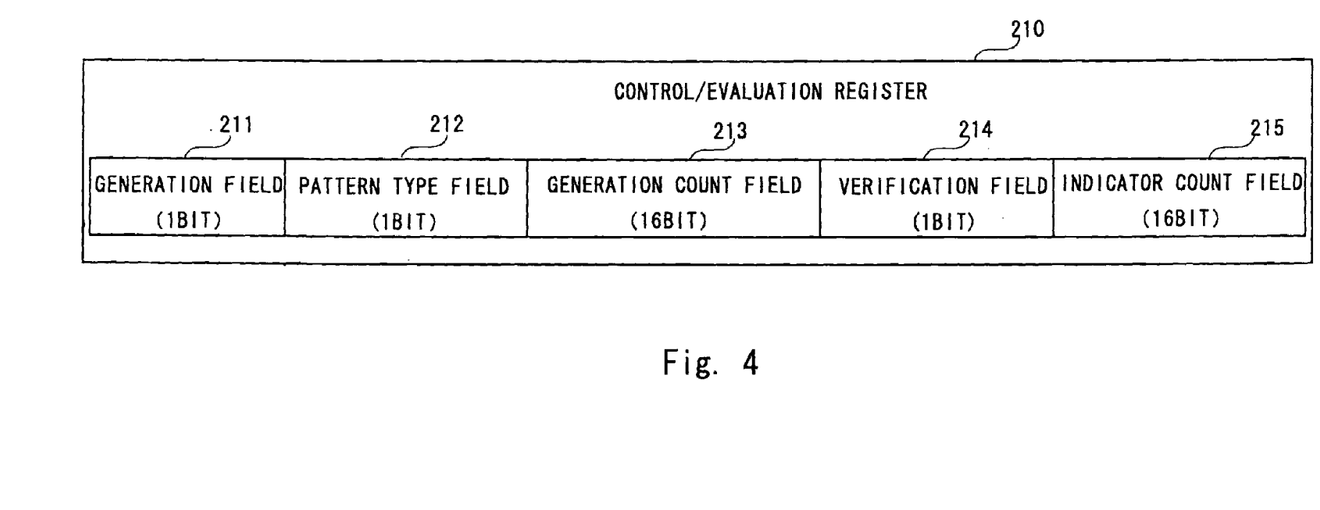
FIG. 4 is a view showing a control/evaluation register in the communication system shown in FIG. 3.

FIG. 4 shows a configuration of the control/evaluation register 210. The control/evaluation register 210 has five fields.

A 1-bit generation field 211 is a field to indicate whether or not to perform jitter test for the transmitting device 220. For example, the generation field 211 having a value "1" indicates "execution of jitter test", and that having a value "0" indicates "normal communication, i.e., non-execution of jitter test".

A pattern type field 212 is a field to indicate the kind of a jitter test pattern to be used in jitter test. Because the 10 GbE standard specifies two kinds of jitter test patterns, the pattern type field 212 is 1 bit that is capable of indicating the kind of pattern.

A generation count field 213 is a 16-bit field to store the number of times the transmitting-end pattern body generation circuit 222 generates a pattern body. The generation count is incremented each time a pattern body is generated by the transmitting-end pattern body generation circuit 222, and it is the same value as the number of times a test pattern frame is output from the transmitting device 220.

A 1-bit verification field 214 is a field to indicate whether or not to perform jitter test to the receiving device 230. Like the generation field 211, the verification field 214 having a value "1" indicates "execution of jitter test", and that having a value "0" indicates "normal communication, i.e., non-execution of jitter test", for example.

In the evaluation of the jitter performance of the communication system, the transmitting device transmits jitter test patterns a plurality of times during a test period. The receiving device compares a jitter test pattern received each time with an original test pattern to check if they match, and the number of times when they match or the number of times when they do not match can be used as an indicator to evaluate the jitter performance. An indicator count field 215 of the control/evaluation register 210 is a field to store the number of times that serves as an evaluation indicator. In this example, the number of times when the received and original jitter test patterns match is used as an evaluation indicator. The indicator count is incremented each time a verification result indicating the matching of a received pattern body and an original pattern body is obtained by the pattern body verification circuit 232.

The transmitting-end pattern body generation circuit 222, the selector 223, the pattern body verification circuit 232, and the receiving-end pattern body generation circuit 238 operate by referring to the control/evaluation register 210. The operation of those functional blocks is described in detail below.

The transmitting-end pattern body generation circuit 222 refers to the generation field 211 and the pattern type field 212 of the control/evaluation register 210. The transmitting-end pattern body generation circuit 222 does not operate when the generation field 211 indicates "0", and it generates a pattern body and outputs it to the selector 223 when the generation field 211 indicates "1". The transmitting-end pattern body generation circuit 222 generates a pattern body of the kind that is indicated by the pattern type field 212.

Each time the transmitting-end pattern body generation circuit 222 generates a pattern body, it outputs a signal indicating the occurrence of generation to the control/evaluation register 210. Upon receipt of the signal, the control/evaluation register 210 increments the generation count field 213.

The transmitting-end pattern body generation circuit 222 outputs the generated pattern body to the selector 223.

The selector 223 selects either one output of the transmitting-end upper circuit 221 and the transmitting-end pattern body generation circuit 222 and supplies the selected one to the transmitting-end MAC circuit 224. The selector 223 makes a selection by reference to the generation field 211 of the control/evaluation register 210. Specifically, the selector 223 selects an output of the transmitting-end pattern body generation circuit 222 when the generation field 211 indicates "execution of jitter test", and selects an output of the transmitting-end upper circuit 221 when the generation field 211 indicates "normal communication".

The transmitting-end MAC circuit 224 uses the frame data or pattern body from the selector 223 to generate a MAC frame that contains these data as a payload.

The transmitting-end PCS circuit 225 encodes the MAC frame from the transmitting-end MAC circuit 224 by the encoder circuit 226. The encoded MAC frame is output to a communication line via a physical layer circuit, which is not shown.

The receiving-end PCS circuit 235, the receiving-end MAC circuit 234, and the receiving-end upper circuit 231 are not described in detail herein.

The receiving-end pattern body generation circuit 238 refers to the verification field 214 and the pattern type field 212 of the control/evaluation register 210. The receiving-end pattern body generation circuit 238 does not operate when the verification field 214 indicates "0", and it generates a pattern body when the verification field 214 indicates "1". The receiving-end pattern body generation circuit 238 also generates a pattern body of the kind that is indicated by the pattern type field 212. By synchronizing the generation field 211 and the verification field 214, the receiving-end pattern body generation circuit 238 generates a pattern body of the same kind as the pattern body that is generated by the transmitting-end pattern body generation circuit 222 in synchronization with the transmitting-end pattern body generation circuit 222.

The receiving-end pattern body generation circuit 238 outputs the generated pattern body to the pattern body verification circuit 232.

The pattern body verification circuit 232 refers to the verification field 214 of the control/evaluation register 210, and it does not operate when the verification field 214 indicates "0", and it verifies a pattern body when the verification field 214 indicates "1". The verification is performed on the pattern body that is supplied from the receiving-end MAC circuit 234 against the pattern body that is supplied from the receiving-end pattern body generation circuit 238, which is an original pattern body.

Each time the pattern body verification circuit 232 obtains a result that shows the matching of the both verification targets, it outputs a signal indicating the occurrence of match to the control/evaluation register 210. Upon receipt of the signal, the control/evaluation register 210 increments the indicator count field 215.

The jitter performance of the communication system 200 can be evaluated with the use of the value of the generation count field 213 and the value of the indicator count field 215.

In the communication system 200 of this embodiment also, the transmitting-end pattern body generation circuit 222 generates a pattern body only, and the pattern body verification circuit 232 verifies a pattern body only. The communication system 200 thus has the same advantage as the communication system 100.

When providing compatibility with a plurality of different kinds of jitter test patterns in the jitter test system 50 of a related art shown in FIG. 7, it is necessary to place the test pattern generation circuit 34 and the test pattern verification circuit 44 for each kind of a jitter test pattern. Each test pattern generation circuit needs to have a function to generate the synchronizing signal, CRC and minimum packet interval portions or the like and add them to a pattern body, which causes a further increase in circuit size. This is the same for each test pattern verification circuit in a receiving end.

On the other hand, in the communication system 200 according to the technique of the present invention, the processing of generating synchronizing signal, CRC and minimum packet interval portions or the like and adding them to a pattern body, which is the transmitting-end processing of a MAC layer, is performed by the transmitting-end MAC circuit 224, which performs the same processing on frame data. It is thereby possible to suppress an increase in circuit size in spite of an increase in the required number of kinds of jitter test patterns. This is the same in the receiving end.

Various modifications that are described for the communication system 100 may be also made for the communication system 200 of the above-described embodiment.

Further, although a test execution field that designates the execution of jitter test is made up of the generation field 211 and the verification field 214 of the control/evaluation register 210 in the communication system 200, a test execution field may be only one, so that both the transmitting device 220 and the receiving device 230 refer to the same test execution field.

Furthermore, although a control register and an evaluation register are configured as one control/evaluation register 210, they may be configured as separate registers.

It is apparent that the present invention is not limited to the above embodiments, but may be modified and changed without departing from the scope and spirit of the invention.

What is claimed is:

1. A communication apparatus based on OSI (Open Systems Interconnection) Reference Model, comprising:
    an upper processing unit to perform processing of an upper layer and output frame data;
    a pattern body generation unit to generate and output a jitter test pattern body for a jitter test;
    a selector to select an output of the upper processing unit during normal communication and select an output of the pattern body generation unit during the jitter test; and
    a transmitting-end MAC unit to perform transmitting-end processing of a MAC (Media Access Control) layer located under the upper layer on data selected by the selector to obtain a MAC frame or a jitter test pattern frame in MAC frame format.

2. A communication apparatus based on OSI (Open Systems Interconnection) Reference Model, comprising:
    a receiving-end MAC unit to perform receiving-end processing of a MAC (Media Access Control) layer on a received frame in MAC frame format;
    an upper processing unit to perform processing of an upper layer on frame data obtained from a MAC frame by the receiving-end MAC unit; and
    a pattern body verification unit to perform verification of a jitter test pattern body obtained from a jitter test pattern frame for jitter test in MAC frame format by the receiving-end MAC unit against a corresponding jitter test pattern body before transmission.

3. A communication system based on OSI (Open Systems Interconnection) Reference Model, comprising:
  a transmitting device;
  a receiving device; and
  a jitter test control device to provide a test instruction to the transmitting device and the receiving device upon execution of a jitter test, wherein
  the transmitting device includes:
    a transmitting-end upper processing unit to perform processing of an upper layer and output frame data;
    a pattern body generation unit to generate and output a jitter test pattern body upon receipt of the test instruction;
    a selector to select an output of the pattern body generation unit upon receipt of the test instruction and select an output of the transmitting-end upper processing unit during normal communication; and
    a transmitting-end MAC unit to perform transmitting-end processing of a MAC (Media Access Control) layer located under the upper layer on data selected by the selector to obtain a MAC frame or a jitter test pattern frame in MAC frame format, and
  the receiving device includes:
    a receiving-end MAC unit to perform receiving-end processing of a MAC layer on a received frame in MAC frame format;
    a receiving-end upper processing unit to perform processing of an upper layer on frame data obtained from a MAC frame by the receiving-end MAC unit; and
    a pattern body verification unit to perform verification of a jitter test pattern body obtained from the jitter test pattern frame by the receiving-end MAC unit against the corresponding jitter test pattern body before transmission upon receipt of the test instruction.

4. The communication system according to claim 3, wherein
  the jitter test control device is placed in one of the transmitting device and the receiving device and connected to another one of the transmitting device and the receiving device so as to provide the test instruction to another one.

5. The communication system according to claim 4, wherein
  the pattern body verification unit previously stores the jitter test pattern body generated by the pattern body generation unit, and
  the pattern body verification unit performs verification using the stored jitter test pattern body and the jitter test pattern body obtained by the receiving-end MAC unit.

6. The communication system according to claim 4, wherein
  the pattern body generation unit of the transmitting device outputs the generated jitter test pattern body to the transmitting-end MAC unit and the pattern body verification unit of the receiving device, and
  the pattern body verification unit performs verification using the jitter test pattern body output from the pattern body generation unit and the jitter test pattern body obtained by the receiving-end MAC unit.

7. The communication system according to claim 4, wherein
  the receiving device includes a receiving-end pattern body generation circuit to generate the same jitter test pattern body in synchronization with the pattern body generation unit of the transmitting device upon receipt of the test instruction, and
  the pattern body verification unit performs verification using a jitter test pattern body generated by the receiving-end pattern body generation circuit and the corresponding jitter test pattern body obtained by the receiving-end MAC unit.

8. The communication system according to claim 3, wherein
  the jitter test control device is placed in each of the transmitting device and the receiving device and provides the test instruction to the transmitting device and the receiving device in synchronization.

9. The communication system according to claim 8, wherein
  the pattern body verification unit previously stores the jitter test pattern body generated by the pattern body generation unit, and
  the pattern body verification unit performs verification using the stored jitter test pattern body and the jitter test pattern body obtained by the receiving-end MAC unit.

10. The communication system according to claim 8, wherein
  the pattern body generation unit of the transmitting device outputs the generated jitter test pattern body to the transmitting-end MAC unit and the pattern body verification unit of the receiving device, and
  the pattern body verification unit performs verification using the jitter test pattern body output from the pattern body generation unit and the jitter test pattern body obtained by the receiving-end MAC unit.

11. The communication system according to claim 8, wherein
  the receiving device includes a receiving-end pattern body generation circuit to generate the same jitter test pattern body in synchronization with the pattern body generation unit of the transmitting device upon receipt of the test instruction, and
  the pattern body verification unit performs verification using a jitter test pattern body generated by the receiving-end pattern body generation circuit and the corresponding jitter test pattern body obtained by the receiving-end MAC unit.

12. The communication system according to claim 3, wherein
  the pattern body verification unit previously stores the jitter test pattern body generated by the pattern body generation unit, and
  the pattern body verification unit performs verification using the stored jitter test pattern body and the jitter test pattern body obtained by the receiving-end MAC unit.

13. The communication system according to claim 3, wherein
  the pattern body generation unit of the transmitting device outputs the generated jitter test pattern body to the transmitting-end MAC unit and the pattern body verification unit of the receiving device, and
  the pattern body verification unit performs verification using the jitter test pattern body output from the pattern body generation unit and the jitter test pattern body obtained by the receiving-end MAC unit.

14. The communication system according to claim 3, wherein
  the receiving device includes a receiving-end pattern body generation circuit to generate the same jitter test pattern body in synchronization with the pattern body generation unit of the transmitting device upon receipt of the test instruction, and
  the pattern body verification unit performs verification using a jitter test pattern body generated by the receiving-end pattern body generation circuit and the corresponding jitter test pattern body obtained by the receiving-end MAC unit.

15. The communication system according to claim 3, wherein the jitter test control device comprises a control register including a test execution field indicating whether to perform a jitter test and provides a test instruction with a value of the test execution field, and the transmitting device and the receiving device refer to a value of the test execution field and perform processing for the jitter test when the value indicates execution of the jitter test.

16. The communication system according to claim 15, wherein the test execution field includes:

a pattern generation field indicating whether to generate a jitter test pattern body; and a pattern verification field indicating whether to verify the jitter test pattern body, the pattern body generation unit and the selector of the transmitting device refer to a value of the pattern generation field and perform processing for the jitter test when the value indicates generation of the jitter test pattern body, and the pattern body verification unit of the receiving device refers to a value of the pattern verification field and perform processing for the jitter test when the value indicates verification of a jitter test pattern body.

17. The communication system according to claim 3, comprising:

a generation count storage unit to store the number of times the pattern body generation unit generates the jitter test pattern body; and an indicator count storage unit to store an indicator count as the number of times of correct receipt or the number of times of incorrect receipt out of verification results of the pattern body verification unit indicating whether the jitter test pattern is received correctly.

18. The communication system according to claim 17, wherein the generation count storage unit and the indicator count storage unit are evaluation registers including respective corresponding fields.

* * * * *